United States Patent
Voss

[15] 3,672,065
[45] June 27, 1972

[54] ANGLE GAGE MECHANISM

[72] Inventor: Raymond G. Voss, 2120 West Pleasant Street, Davenport, Iowa 52804

[22] Filed: Nov. 9, 1970

[21] Appl. No.: 88,017

[52] U.S. Cl. ............................................33/185 R, 33/75 R
[51] Int. Cl. ......................................................B27g 23/00
[58] Field of Search..............33/181 R, 185 R, 75 R, 180 R, 33/201

[56] References Cited

UNITED STATES PATENTS

| | | | |
|---|---|---|---|
| 1,427,510 | 8/1922 | Avery...................................33/181 R |
| 2,216,766 | 10/1940 | Cook....................................33/181 R |
| 3,079,694 | 3/1963 | Yemmans.............................33/185 R |
| 3,229,372 | 1/1966 | Quashnock............................33/75 R |

*Primary Examiner*—William D. Martin, Jr.
*Attorney*—Molinare, Allegretti, Newitt & Witcoff

[57] ABSTRACT

An angle mechanism for use in setting up workpieces in a machine tool at any given angle in relation to the machine tool spindle or chuck centerline so that surfaces of the workpiece may be machined in the desired relationship to the given angle. The angle gage mechanism includes a shank assembly suitable for mounting in the machine tool spindle or chuck and a protractor-like member pivotally mounted on the shank assembly, the protractor-like member having gage edges that lie in a plane passing through the centerline of the shank assembly. The shank assembly includes clamping means to clamp the protractor-like member at a predetermined angle to the centerline of the shank assembly. The angle gate mechanism may include a reverse angle attachment to permit use of the mechanism through 360°.

9 Claims, 6 Drawing Figures

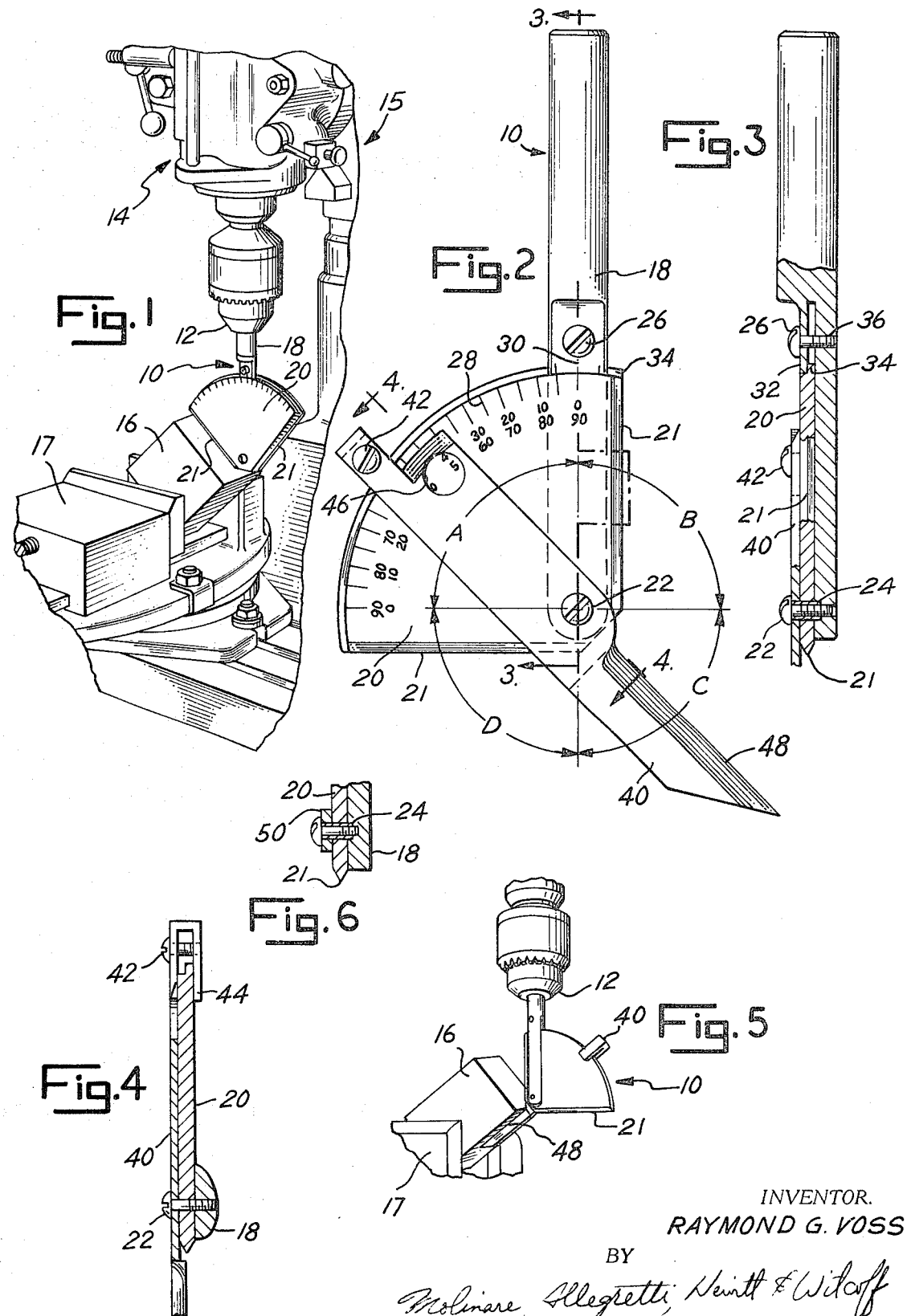

ANGLE GAGE MECHANISM

BACKGROUND OF THE INVENTION

This invention relates to an angle gage mechanism which is used to set up work, for example, semi-finished parts or raw stock, in a machine tool, for example, a drill or a lathe at a given angle in relation to the machine tool spindle centerline. By setting up the work at a given angle, surfaces of the work may be machined to the desired relationship to the set-up angle.

In the past, various means were used to set up a workpiece in a machine tool. For example, in Hanks U.S. Pat. No. 3,228,112 a layout device is disclosed which provides a tool for locating and marking desired layout points around an axis or around a single point. Städele U.S. Pat. No. 3,507,047 reveals a mechanism for mounting in a spindle which establishes zero position when setting up work on milling and drilling machines. Zero position does not refer to setting an angle of zero, but rather, is it used to arrange a work surface with respect to the machine tool spindle centerline. Rudhart U.S. Pat. No. 2,625,746 shows another means of centering a workpiece with respect to a spindle centerline.

This prior art, while showing mechanisms which mount in machine tool spindle do not disclose mechanisms to set up workpieces at predetermined angles relative to the machine tool spindle centerline. One means of establishing the angle of the workpiece without the use of the spindle or chuck is shown in Waite et al. U.S. Pat. No. 318,526. This patent shows a taper measuring device which utilizes a protractor pivotally mounted in an assembly intermediate its ends and adapted to fit into the tool post of an engine lathe. The single purpose taper measuring tool bears only superficial resemblance to the present invention. The Waite et al. tool must be set initially with the protractor blade parallel to the work axis to be accurate. If the work axis is offset, the subsequent measurement or set-up is offset.

Of primary importance in the present invention is the fact that the knife edge gaging surfaces of the protractor lie in a common plane with both the centerline of the shank assembly and the machine tool spindle centerline. Waite et al. relates the workpiece angle to an independent tool post. In Waite et al, the protractor is mounted on top of a shank but the protractor does not pivot in a common plane with the spindle centerline. By the common plane-centerline arrangement of the present invention, the proper angular relationship between the workpiece and the spindle centerline is always assured. In addition, measurements in the Waite et al. device are limited to no more than 180° due to the position of the clamp screws. The present invention is adaptable to 360° angular measurement by the addition of an easily mounted reverse angle attachment.

SUMMARY OF THE INVENTION

An angle gage mechanism for setting up workpieces in a machine tool at a given angle in relation to the machine spindle or chuck centerline. The angle gage mechanism includes a shank assembly with a longitudinal centerline. The shank assembly centerline is coaxial with the spindle centerline as one end of the shank assembly is constructed and arranged for mounting in the machine tools' self-centering chuck, collet, end mill holder, taper adapter or the like. At the other end of the shank assembly, a protractor is pivotally mounted about its own center point. The protractor, having first and second knife edges comprising first and second gaging surfaces, pivots in a plane which is common with the centerline of the shank assembly. Clamping means are disclosed which are integral to the shank assembly and located intermediate the ends of the shank assembly. The clamping means serve to clamp the protractor and hence the knife edge gaging surfaces at a predetermined angle to the centerline of the shank assembly. A workpiece can then be aligned with the gaging surfaces to establish the workpiece at a predetermined angle with the spindle centerline.

It is an object of the present invention to provide an angle gage mechanism for establishing predetermined desired angles between a workpiece and a machine tool spindle centerline.

A further object of the present invention is to provide an angle gage mechanism whereby tools may be set at a given angle to a lathe spindle centerline for the purpose of forming angles and shapes on work or stock to be turned.

Still another object of the present invention is to provide an angle gage mechanism to inspect worked-on parts for correct relationship of one angle to another.

One further object of the present invention is to provide an angle gage mechanism having 360° measurement and set-up capability.

These and other objects, advantages and features of the present invention will become more apparent hereafter.

BRIEF DESCRIPTION OF THE DRAWINGS

In the detailed description which follows, reference will be made to the drawings wherein like numerals refer to like parts:

FIG. 1 is a perspective view of a vertical drilling machine illustrating a workpiece on the machine being aligned with a gaging surface on an angle gage mechanism embodying principles of the present invention;

FIG. 2 is an elevation view of the angle gage mechanism of the present invention, with a reverse angle attachment in position thereon;

FIG. 3 is a cross-sectional view of the angle gage mechanism taken along line 3—3 of FIG. 2 and illustrating the relationship between the shank assembly and protractor;

FIG. 4 is a cross-sectional view of the angle gage mechanism taken along line 4—4 of FIG. 2 and illustrating the reverse angle attachment on the end of the shank assembly;

FIG. 5 is a perspective rear view of the angle gage mechanism, with the reverse angle attachment shown in position for setting up a workpiece in quadrant C as shown in FIG. 2;

FIG. 6 is a detail cross-sectional view of the end of the shank assembly of the present invention showing the pivot sleeve and pivot screw for the protractor, and showing the spacer utilized with the angle gage mechanism of FIG. 1 when no reverse angle attachment is used.

DESCRIPTION OF THE PREFERRED EMBODIMENTS

Referring to FIG. 1, the angle gage mechanism indicated generally as 10 is mounted in a machine holder 12, for example spindle or chuck, of machine tool headstock 14. The machine tool 15 shown is of the vertical drilling machine type commonly found in machine shops. The angle gage mechanism 10 can also be used in a milling machine, jig bore, or similar kind of apparatus. The invention also has utility in horizontal applications such as lathes, etc., as will be discussed hereafter when describing the operational sequence. Workpiece 16 is shown set up in alignment with a gaging surface of angle mechanism 10. After the workpiece is properly secured in holding fixture 17 of machine tool 15, the angle gage mechanism will be removed from chuck 12 and a drill will be substituted. A hole will then be drilled into workpiece 16 at a predetermined angle.

The angle gage mechanism 10 is comprised basically of shank assembly 18 and protractor 20 pivotally carried on the lower end of the shank assembly. The protractor 20 has knife edge defining gaging surfaces 21.

As best seen in FIG. 2, a first end of shank assembly 18 of angle gage mechanism 10 is cylindrical in shape and is suitable for mounting in chuck 12. Protractor 20 comprises a body portion extending through at least 90° so the gaging surfaces 21 on protractor 20 are at right angles to one another. The protractor 20 is shown mounted on the shank assembly by pivot means including pivot screw 22 and by protractor clamp screw 26. When protractor clamp screw 26 is loosened, protractor 20 pivots about pivot screw 22 on pivot sleeve 24. Pivot sleeve 24 can best be seen by referring to FIGS. 3 and 6.

To set protractor 20 at a given angle, the calibration scale denoted generally as 28 is aligned with corresponding indicia marked on the shank assembly as 30.

As seen in FIG. 3, protractor clamping means are provided on the shank assembly intermediate its ends. Such clamping means comprise protractor clamp screw 26 which extends through a lip 32 of shank assembly 18. Lip 32 overlaps a ledge 34 of protractor 20 so that when protractor clamp screw 26 is tightened in a tapped hole 36, the lip 32 is forced against ledge 34 thereby clamping the protractor 20 at a given angle. The protractor edges or gaging surfaces 21 are knife-edge in shape and lie in a common plane. Further, the longitudinal centerline of shank assembly 18 and hence the centerline of chuck 12 are disposed in this common plane. To establish a quadrant frame of reference, the 360° rotation about pivot screw 22 is divided in four quadrants, A, B, C, and D (FIG. 2). Quadrants A and B are on a first side of a line passing through pivot screw 22 transverse to the shank assembly centerline. Quadrants C and D are on the opposite side of the transverse line. Quadrant A begins at the 9:00 o'clock position and extends 90° clockwise to the 12:00 o'clock position. Quadrants B, C, and D follow in 90° segments.

Protractor 20 can be pivoted to set up all angles in quadrants A and B. To set up angles in quadrants C and D, a reverse angle attachment 40 is attached to protractor 20, as shown in FIG. 2. The reverse angle attachment 40 is pivotally mounted about pivot screw 22 joined to the lower end of the shank assembly and projects a gaging surface through quadrants C and D on the second side of the transverse line. This reverse angle attachment and hence the gaging surface thereon can be clamped to set up angles by means of an attachment clamp screw 42. Attachment clamp screw 42 extends through the end of reverse angle attachment 40, as best seen in FIG. 4. Tightening attachment clamp screw 42 causes the lip 44 protruding over an edge of protractor 20 to clamp attachment 40 to protractor 20. When the reverse angle attachment 40 is in place, it pivots across the surface of the protractor. An opening 46 in attachment 40 permits the operator to read the calibration scale 28. Knife edge 48 of attachment 40 is in direct line with opening 46 to assure accuracy and ease of observation in angle setting in quadrants C and D. Furthermore, knife edge 48 of reverse angle attachment 40 lies in the common plane with the knife edge 21 and the centerline of the shank assembly 18.

FIG. 5 shows a rear view of the angle gage mechanism 10 with the reverse angle attachment 40 set at an angle; the workpiece 16 in holding fixture 17 of a machine tool is being aligned with knife edge 48 of attachment 40.

When setting up angles in quadrants A and B, the reverse angle attachment 40 may be removed and replaced with spacer 50. Spacer 50 as shown in FIG. 6 keeps protractor 20 and hence gaging surfaces 38 pivoting in a common plane with the centerline of the shank assembly centerline.

OPERATION

For application in a vertical milling machine, drill press or jig bore, the angle gage mechanism 10 is placed in the machine spindle and secured by the use of a self-centering chuck, collet, end mill holder or taper adapter. For quadrants A and B, the calibrated scale of protractor 20 is set in predetermined desired alignment with the scale 30 on the shank assembly and locked in position with the protractor clamp screw 26. The desired angle is thus maintained between the protractor edges or gaging surfaces 21 and the shank assembly and hence spindle centerline. The machine tool spindle is turned so that the plane of the protractor 20 is at right angles to the workpiece surface. The workpiece 16 is then brought into contact and aligned with the protractor gaging surface 21. The workpiece is lightly damped in the holding fixture and the spindle is slowly rotated back and forth to allow the operator to observe the light gap between the gaging surface 21 and the workpiece. Any fine adjustments if necessary can be made to the workpiece alignment and the workpiece 16 can then be firmly clamped in place. For quadrants C and D, the reverse angle attachment 40 can be mounted on the angle gage mechanism by removing the pivot screw 22, and replacing the spacer 50 with the reverse angle attachment. The above procedure may then be followed to set up angles in quadrants C and D, it being understood that the procedure for checking angles in quadrant D is accomplished by setting up the mechanism 10 as if to check in quadrant C, then rotating the spindle 180°. The angle gage mechanism is then removed and replaced by a tool to machine the workpiece surfaces at the desired angle.

In a horizontal application such as an engine lathe, tools may be set up at a predetermined angle. The angle gage mechanism 10 is secured in the lathe spindle, chuck or collet, and the protractor scale is then set to the desired angle in the manner described above. The spindle is rotated until the protractor blade is horizontal with the lathe bed. The cutting edge of the forming tool is brought into contact with the protractor gaging surface and clamped into position. The angle gage mechanism 10 is then replaced in the spindle with the workpiece and the lathe is ready for operation.

The same function of setting up tools can be accomplished by installing the reverse angle attachment on the angle gage mechanism and mounting the angle gage mechanism in the lathe tail stock. This permits setting of the forming tool angle while the workpiece remains in the spindle.

Thus, it is seen that the angle gage mechanism of the present invention provides a fast, simple and accurate mechanism for setting up parts at a given angle in relation to a machine holder's centerline. It can also be used in both vertical and horizontal applications to inspect angles on finished parts, and the mechanism can also be used on horizontal lathes to set tool angles to insure optimum cutting on the stock to be turned.

While I have shown a presently preferred form of the invention, it will be understood that the invention is not limited thereto, since it may be otherwise embodied within the scope of the following claims.

What is claimed is:

1. An angle gage mechanism to set up workpieces in a machine tool at a given angle in relation to the machine holder centerline comprising, in combination: a shank assembly with a longitudinal centerline, said shank assembly having first and second ends, said first end being constructed and arranged for mounting in a machine holder so that said shank assembly centerline is co-axial with said machine holder centerline; a protractor-like member having first and second edges defining first and second gaging surfaces, said protractor-like member rotatably mounted on pivot mounting means substantially near said second end of said shank assembly, said gaging surfaces movable in a common plane with said centerline of said shank assembly; and said shank assembly including clamping means intermediate said first end and said second end to clamp said protractor-like member at a predetermined angle with respect to said centerline of said shank assembly so that the workpiece can be brought into alignment with said first or second gaging surfaces to align said workpiece at a predetermined angle with respect to said centerline of said machine holder.

2. An angle gage mechanism as in claim 1 wherein said clamping means are integral to said shank assembly and include a protractor clamp screw extending through a lip which overhangs said protractor-like member, such parts being constructed and arranged so that when said clamp screw is tightened to clamp said protractor-like member under said lip, said gaging surfaces will be retained at a predetermined relationship relative to the machine holder centerline.

3. An angle gage mechanism as in claim 1 wherein said pivot mounting means include a pivot screw and a pivot sleeve.

4. An angle gage mechanism as in claim 1 wherein said gaging surfaces are substantially knife edges which lie in a common plane with one another.

5. An angle gage mechanism as in claim 4 wherein said first and of said shank assembly is circular in cross section to assist self-centering of said shank assembly in a conventional machine holder.

6. An angle gage mechanism as in claim 4 wherein the protractor-like member comprises a body portion extending through at least 90°, said gaging surfaces being on said body portion at right angles to one another.

7. An angle gage mechanism as in claim 1 wherein a reverse angle attachment is pivotally mounted on said shank assembly, said reverse angle attachment providing a third gaging surface, said third gaging surface lying in said common plane of said first and second gaging surfaces to provide for 0° to 360° angle set-up capability of said angle gage mechanism.

8. An angle gage mechanism as in claim 7 wherein the protractor-like member has calibration on a face thereof and a portion of said reverse angle attachment covering said calibration on said face of said protractor-like member has an opening therein to reveal said calibration to allow optimum reading of the angle being set.

9. An angle gage mechanism as in claim 7 wherein means for mounting said reverse angle attachment include said pivot screw about which said reverse angle attachment pivots and a reverse angle attachment clamp screw which clamps said reverse angle attachment to said protractor-like member.

* * * * *